Feb. 23, 1965   J. K. ROPER   3,170,432
MECHANICAL CONTROL FOR SUBMERGED HYDROFOIL SYSTEMS
Filed April 14, 1964   3 Sheets-Sheet 1

INVENTOR.
JOHN K. ROPER
BY
Davis, Hoxie, Faithfull & Hapgood
ATTORNEYS.

Feb. 23, 1965 J. K. ROPER 3,170,432
MECHANICAL CONTROL FOR SUBMERGED HYDROFOIL SYSTEMS
Filed April 14, 1964 3 Sheets-Sheet 2

INVENTOR.
JOHN K. ROPER
BY
Davis, Hoxie, Faithfull & Hapgood
ATTORNEYS.

INVENTOR.
JOHN K. ROPER

United States Patent Office

3,170,432
Patented Feb. 23, 1965

3,170,432
MECHANICAL CONTROL FOR SUBMERGED
HYDROFOIL SYSTEMS
John K. Roper, Stony Brook, N.Y., assignor to Atlantic Hydrofoils, Inc., Stony Brook, N.Y., a corporation of New York
Filed Apr. 14, 1964, Ser. No. 359,563
10 Claims. (Cl. 114—66.5)

The present invention relates to an automatic, passive, mechanical control system for stabilizing the motions of marine craft which are supported by submerged hydrofoil systems and which are subject to operation under either calm water or wave conditions.

In the operation of hydrofoil marine craft with uncontrolled submerged hydrofoil support systems, it is known that the craft requires some form of height stabilization control when operating in either smooth water or waves. In smooth water, uncontrolled submerged hydrofoil systems may develop continuously oscillating, heaving and pitching motions or so-called divergent pitching or heaving motions which may cause the hull of the hydrofoil craft to crash against the water surface. When uncontrolled submerged hydrofoil systems are run in a seaway, the wave disturbing forces can result in extremely uncomfortable heaving and pitching motions of the craft and/or cause the bow of the hull to crash onto oncoming wave flanks. All the above described events can seriously hamper or prevent successful operation of the hydrofoil boat.

In the past, many attempts were made to control the hydrodynamic forces on the submerged hydrofoil by the use of combined electronic and mechanical control systems. These control systems usually sense the disturbance of the craft by continuously monitoring (usually electrically) the accelerations or motions of the craft and then, by mechanical means, provide for effective angle of attack changes on the submerged foils to vary the hydrodynamic disturbing forces on the hydrofoil in order to overcome the wave disturbances. These electronic-mechanical auto-pilot systems are complex in design, require continuous maintenance, are costly, and could cause a hydrofoil boat to be inoperable if only one of its many components becomes defective.

Savitsky Patent No. 3,092,062, dated June 4, 1963, discloses a passive, mechanical, automatically operating simple hydrofoil control system which possesses all the advantages of a submerged hydrofoil system without the complexity, expense, and involved maintenance required of electronic-mechanical auto-pilot systems. As disclosed in that prior patent, a control flap on the submerged hydrofoil is mechanically linked to a vertical trailing edge flap on the vertical strut which supports the submerged hydrofoil to the hull of the craft. In smooth water operation of a marine craft using this prior system, as the hydrofoil boat tends to fall towards the water surface, the vertical flap on the vertical support strut is so arranged as to be deflected by the hydrodynamic force developed by the increased effective immersion of the flap. Through a suitable linkage system the deflection of the vertical flap causes a deflection of the control flap on the submerged hydrofoil, thus increasing the hydrodynamic lift on the hydrofoil and causing the hydrofoil craft to rise until an equilibrium altitude is attained. At some pre-selected operating height of the boat, the vertical flap is designed to be clear of the water and the height stabilization is achieved by the natural hydrodynamic phenomena wherein the submerged hydrofoil loses hydrodynamic lift as it approaches the free water surface and gains lift as its submergence is increased.

In the use of this prior system on marine craft operating in waves, the rising water surface of the wave profile actuates the vertical flap so that its deflection causes a deflection of the flap of the submerged foil which in turn increases the hydrodynamic lift force on the submerged hydrofoil so as to raise the hull over the oncoming wave flank. The size of the submerged hydrofoil control flap, the size of the vertical depth control flap on the vertical support strut and the required mechanical linkages between these flaps are arranged and proportioned to provide any desired sensitivity and response characteristics to wave disturbances as to assure a minimum total craft response to the hydrodynamic forces developed by operation in waves.

The present invention utilizes the general mode of operation of said prior invention but, as one feature, provides for a ventilated vertical flap which may be positioned on the streamlined vertical support strut at any point other than that where both sides of this flap are in streamlined alignment with the corresponding sides of said vertical support strut (where the profile of the flap and the profile of the strut are continuous). This provision for air ventilation of one surface of said flap permits the marine craft to operate without the heaving and rolling which may arise in craft having a vertical flap in symmetrical, streamlined profile alignment with the vertical strut. In such craft, when the vertical flap is pivoted, the water flow across the negative pressure surface of the flap may erratically break away from this surface, particularly at higher boat speeds, and thereby introduce air to said surface at a different pressure than water flow creates on the surface. The orientation of said flap, and therefore of the submerged hydrofoil control flap, will then change due to the change in differential pressure between opposite sides of the flap.

In hydrofoil craft generally having two vertical struts and flaps with accompanying submerged control flaps, this breakaway action may occur at only one vertical flap due to small constructional variations of the vertical struts and flaps, or due to different struts and flaps being exposed to different wave motions. The breakaway action at one vertical flap, and the resultant reorientation of the submerged hydrofoil control flap, will therefore cause the craft to roll. Breakaway action at both vertical flaps will cause a pitching of the craft due to reorientation of both submerged control flaps. This breakaway action occurs randomly and is extremely difficult to prevent by design modifications.

The ventilated vertical flap of the present invention provides, at all times when said vertical flap is submerged, for an air cushion or pocket adjacent the surface of the vertical flap where breakaway might be expected to occur. This air pocket is a constant, rather than erratic, parameter and is easily designed into the mechanical hydrofoil control system.

Another feature of the present invention is the provision of two vertical and oppositely pivoting flaps to be positioned on the vertical support strut. The use of only one vertical flap, which generally pivots only to one side of the support strut and has only one surface exposed to positive pressure from the flow of water, causes a bending moment to be exerted on said strut. This bending moment, at higher boat speeds, will exert large forces on the vertical strut which must be structurally compensated for. In addition, where an odd number of vertical struts and associated flaps are used on a hydrofoil craft, the bending moment will tend to turn the craft and must be compensated for. The use of two vertical flaps, orientated on each vertical strut to pivot to opposite sides of said strut, respectively, alleviates both of these problems by balancing two bending moments against each other at each said strut. Additionally, the use of the two said flaps provides for an air cushion adjacent the inner surface of each vertical flap, and the breakaway problem is avoided.

A further feature of the present invention is to provide a hydrofoil craft having vertical flaps of the forms described above, which may achieve self-compensating cruise equilibrium and maintain a relatively constant level of the craft above the water at a plurality of distinctly different cruise speeds. Present hydrofoil craft, with a self-compensating submerged control system such as described in said prior patent, achieve such equilibrium only within a few percentage points of one designed cruise speed, at which point the vertical flaps are completely out of the water. Varying the speed of the boat over a wider range changes the level of the boat above the water sufficiently to render its self-compensating control ineffective at higher levels or to drop the boat towards the water so that it is influenced by waves striking the boat hull.

According to this further feature of the invention, the vertical flaps on the vertical control struts are divided into a plurality of distinct sections, each section providing self-compensating control of the hydrodynamic lift of the boat at a different cruise speed and maintaining the craft at a relatively constant level over the water for each cruise speed.

An additional feature of the present invention is the provision of submerged hydrofoil control means which are not subject to the flow breakaway problem discussed above in relation to the vertical flaps positioned on said vertical strut.

A further feature of the present invention is the provision of vertical flap means positioned on said vertical strut which will soften the response of the submerged hydrofoil controls to larger waves and which will tend to disregard small waves of insufficient height to strike the hull of the boat when it is at cruising speed.

Other features and the attendant advantages of the present invention will be readily appreciated by reference to the following description, when considered in connection with the accompanying drawings wherein.

Figure 1:
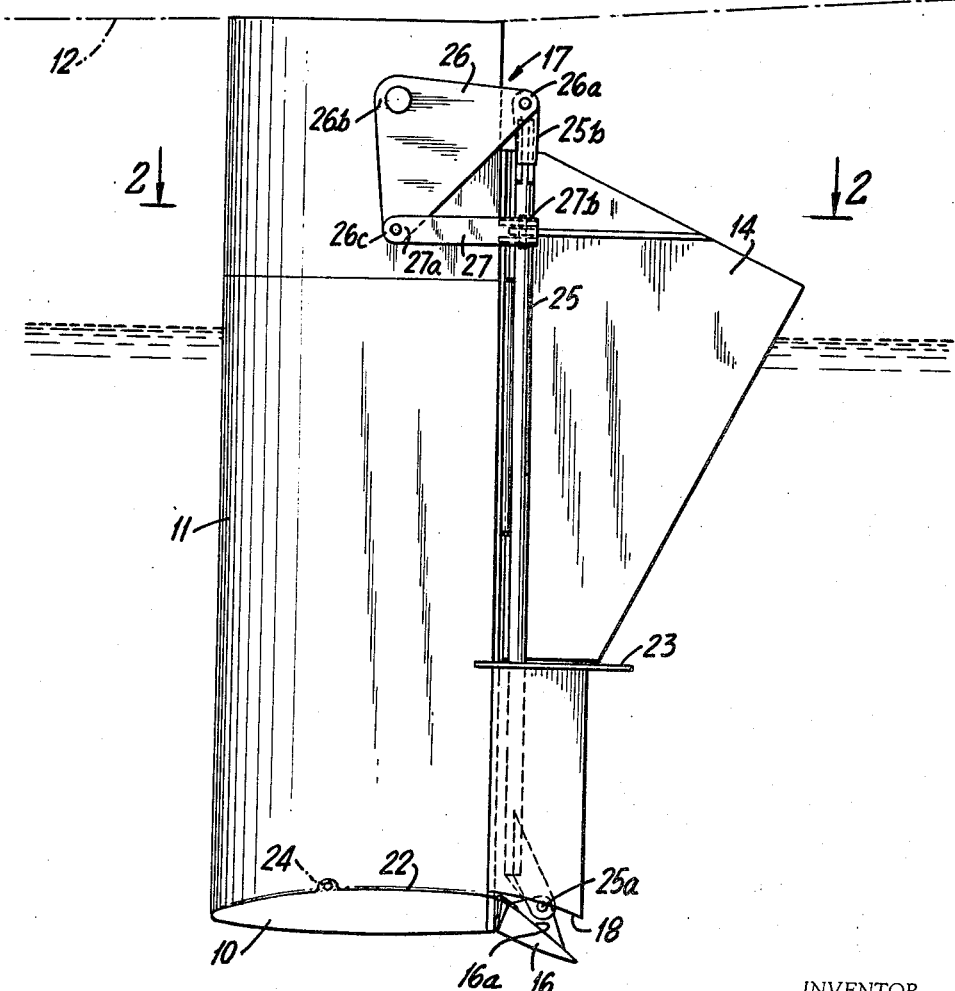
FIGURE 1 is a side view of an embodiment of the present invention, illustrating a hydrofoil system which includes a ventilated flap positioned on a support strut vertically mounted to a hydrofoil marine craft.
Figure 4:
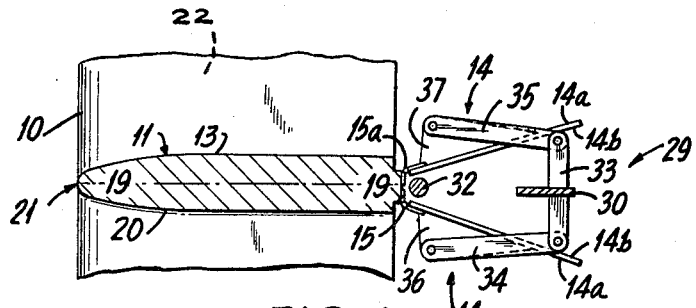
FIGURE 4 is a sectional view on line 4—4 in FIGURE 3.

Referring now to the drawings, wherein like reference characters designate corresponding structure throughout the several views, there is shown in FIGURE 1 a submerged hydrofoil 10 attached to a vertical support strut 11 which is in turn attached at its top portion to the hull of a marine craft 12. Mounted at the rear of strut 11 adjacent side 13 of said strut is vertical flap 14, which pivots about strut edge 15. Pivotally attached to submerged hydrofoil 10 at its trailing edge is horizontal control flap 16, and a mechanical linkage generally indicated as 17 connects vertical flap 14 and horizontal flap 16.

Vertical flap 14 is shown in FIGURE 1 to be partially immersed in water so that its operation may be better understood. This immersion represents low speed operation of the boat, and the hydrodynamic load on flap 14 causes a full down deflection of submerged hydrofoil flap 16. This full down deflection of flap 16 causes a large lift coefficient to be developed by the submerged hydrofoil, and a large hydrodynamic lift force is developed so that the boat tends to lift itself out of the water. As the speed of the craft is increased, two conditions are developed. First, that the required lift coefficient to support the craft is decreased and, secondly, the craft will start to rise so that the hull is lifted out of the water. As the craft rises, the vertical flap 14 rises, immersion is reduced and its hydrodynamics load is reduced. The increased load on the submerged flap 16 causes its own deflection to be reduced and in turn, through the linkage system 17, causes the vertical flap 14 to increase its flap angle until an equilibrium moment condition is achieved between the vertical flap and horizontal flap loads. This process continues, i.e., as the craft goes faster, the hydrofoil flap 16 loads are increased, the craft rises, reducing the effectiveness of the vertical flap 14 until the craft reaches an equilibrium cruise height at which the vertical flap is completely out of the water and the hydrofoil flap is no longer deflected, its further movement being prevented by a physical upper stop 18.

Further increases in craft height are then controlled by the hydrodynamic phenomena which causes a reduction in hydrofoil lift as the submerged dihedral hydrofoil approaches the free water surface. If, for some reason, the craft is caused to move towards the free water surface, the vertical flap 14 is then actuated causing a deflection of the hydrofoil flap 16, which in turn causes the hydrodynamic lift force to be increased and hence causes the craft to rise again to an equilibrium condition.

This operation as so far described is the same as set forth in said prior patent. In said prior system, however, the vertical flap is in the shape of a streamlined air foil, and is positioned at the trailing edge of the streamlined vertical strut such that both of its sides, respectively, constitute streamlined continuations of the two side surfaces of said strut. As said flap encounters water flow and pivots, one side is directly exposed to the positive force of water flow and the other side is exposed to a suction or negative pressure, created by the tangential flow of water along said side surface. At certain higher boat speeds, however, said tangential flow of water may erratically and intermittently break away from said flap surface and introduce air between the water flow and said surface. The pressure on said surface then changes from negative to positive due to the air introduction, and therbey changes the orientation of the vertical flap from what it is designed to be when water tangentially flows along in contact with said surface. This reorientation acts through the mechanical linkage to change the orientation of the submerged hydrofoil flap, and the boat is caused to roll or pitch depending on the number of vertical flaps on the boat effected by flow breakaway. The occurrence of the flow breakaway has been found to be completely unpredictable and difficult to prevent. The present improvement therefore provides for an air pocket on one side of vertical flap 14 whenever the other side is exposed to the positive force of water flow, and this constant parameter, by always being present, is easily designed into the dynamic response of the hydrofoil control system. This air pocket is provided by mounting vertical flap 14 so that its profile forms a distinct discontinuity with the profile of vertical strut 11, whereby only side 14a of said flap is subject to the water flow past strut 11. The water flow along side 20 of strut 11 breaks away at strut edge 21 in a stable stream, as shown in FIGURE 1, and joints the water flow along side 13 only at or past the trailing end 14c of flap 14. In this manner, side 14b of flap 14 always has a layer of air adjacent thereto. The mounting position of ventilated flap 14 is not restricted to that shown in FIGURE 1, as this flap may be pivoted to leading edge 21 of strut 11 to extend rearwardly along a side of said strut; or it may be pivoted to extend rearwardly at any position along a side of said strut. In either case flap 14 is asymmetrically mounted with fore and aft axis 19—19 of vertical strut 11 and one side of said flap will always be ventilated with a layer of air adjacent thereto so as not to be exposed to a control disturbing, intermittent tangential flow of water at certain boat speeds.

The ventilated flap 14 described above, having less pressure differential between the two sides of the flap than in said prior system, does not exert the degree of bending moment on strut 11 that the streamlined, symmetrically mounted vertical flap of the prior system provides. The structural reinforcement required for the vertical support strut is therefore substantially less. In addition, the flow characteristics around the strut and ventilated flap are of course changed from the prior system, and the ventilated flap orientation is found to provide less hydrodynamic drag at the support strut.

Figure 3:
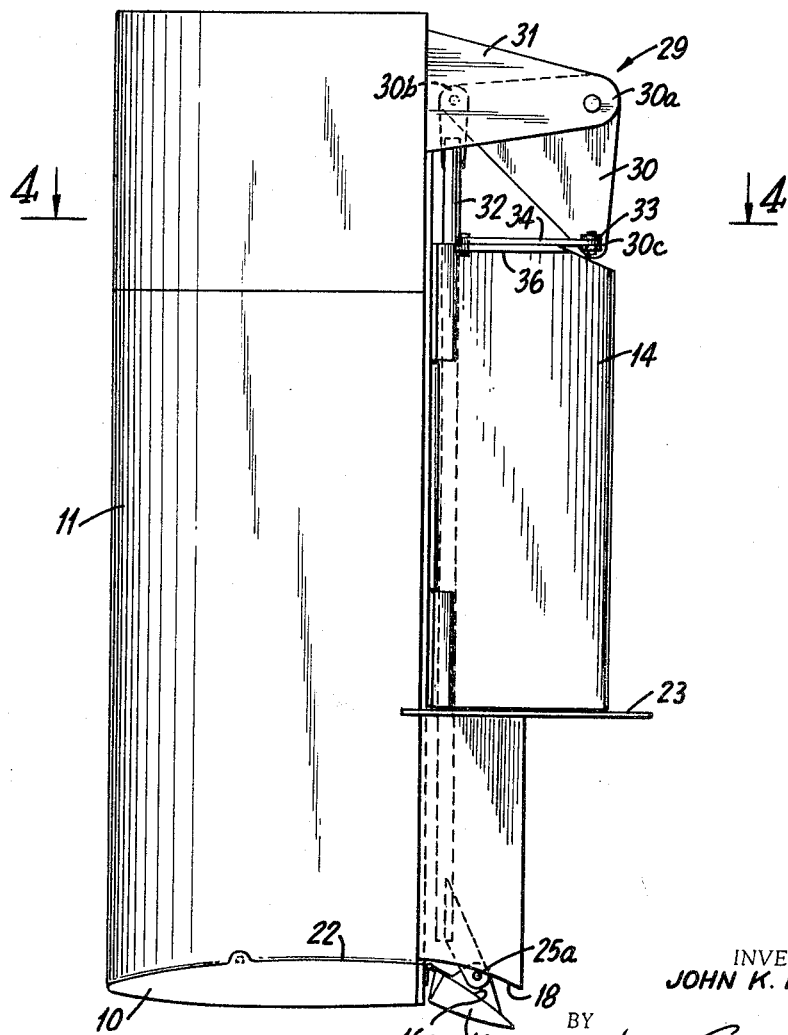
FIGURE 3 is a side view of another embodiment of the present invention, illustrating a hydrofoil control system which includes two ventilated flaps positioned on a support strut suitable for vertical mounting on a hydrofoil marine craft.

Ventilated flap 14 may be in the generally rectangular form of the flaps shown in FIGURE 3, but a downwardly tapered shape as shown for flap 14 in FIGURE 1 has been found to have distinct advantages. When the hydrofoil craft is at cruise speed, with flap 14 out of the water, short waves of insufficient height to strike the hull of the boat will only react with the lower, small area portion of flap 14; the response of the hydrofoil craft will be relatively slight, as it should be for waves which will not affect control of the hydrofoil. Higher waves will react with the entire area of flap 14, and the hydrofoil craft will essentially contour and lift over these waves. Tapered flap 14 is again of value, since the lower, small area portion thereof will tend to ignore the small chop found on top of many waves. The gradually increasing sensitivity of flap 14, due to its tapered configuration (which may be linear or curvilinear), essentially softens the response of the hydrofoil craft to all waves by providing for said waves to react with flap 14 in a smoothly increasing fashion. A further means of varying said response, if desired, is to twist flap 14 into various configurations.

Flap 16 is shown in FIGURE 1 pivotally mounted to the trailing edge of hydrofoil 10. In hydrofoil craft designed for very high speeds, however, such a mounting may cause water flow along surface 22 of said hydrofoil to breakaway from surface 16a of flap 16 when said flap is pivoted in a downward direction. Cavitation plate 23 mounted below flap 14 on strut 11, will prevent air being introduced to surface 16a, but water vapor will form between surface 16a and the adjacent water flow. This breakaway at flap 16 affects the flow characteristics over the entire hydrofoil 10, and renders said hydrofoil much less effective as a lifting agent. An arrangement to obviate this breakaway problem is to do away with flap 16 on the trailing edge of hydrofoil 10, and in fact to utilize the entire hydrofoil as a flap by pivotally mounting said hydrofoil at 24 (shown in phantom at the hydrodynamic center of pressure of hydrofoil 10) to vertical strut 11. Hydrofoil 10, due to its large surface, then only needs to be pivoted slightly to provide the same amount of lift as would be provided by a flap 16 pivoting to a larger extent, and therefore will not encounter the flow breakaway which might occur over said flap 16.

Linkage 17 shown in FIGURE 1 consists of push rod 25, triangular linkage 26 and push rod 27. Vertical push rod 25 is pivotally mounted at one end 25a to flap 16, and is pivotally mounted at its other end 25b to vertex 26a of triangular linkage 26. Vertex 26b of said linkage is pivotally affixed to vertical strut 11, and vertex 26c is pivotally connected to end 27a of push rod 27. The other end 27b of push rod 27 is pivotally connected to flap 14. When water flow intersects vertical flap 14, causing it to pivot, triangular linkage 26 in turn pivots about vertex 26b and translates said flap pivoting motion into up and down motion of push rod 25 and pivoting motion of flap 16. The deflection rate of one said flap may be adjusted to any desired proportion of the other flap's deflection rate by merely changing the positions of pivot points 26a or 26c relative to fulcrum 26b.

Figure 5:
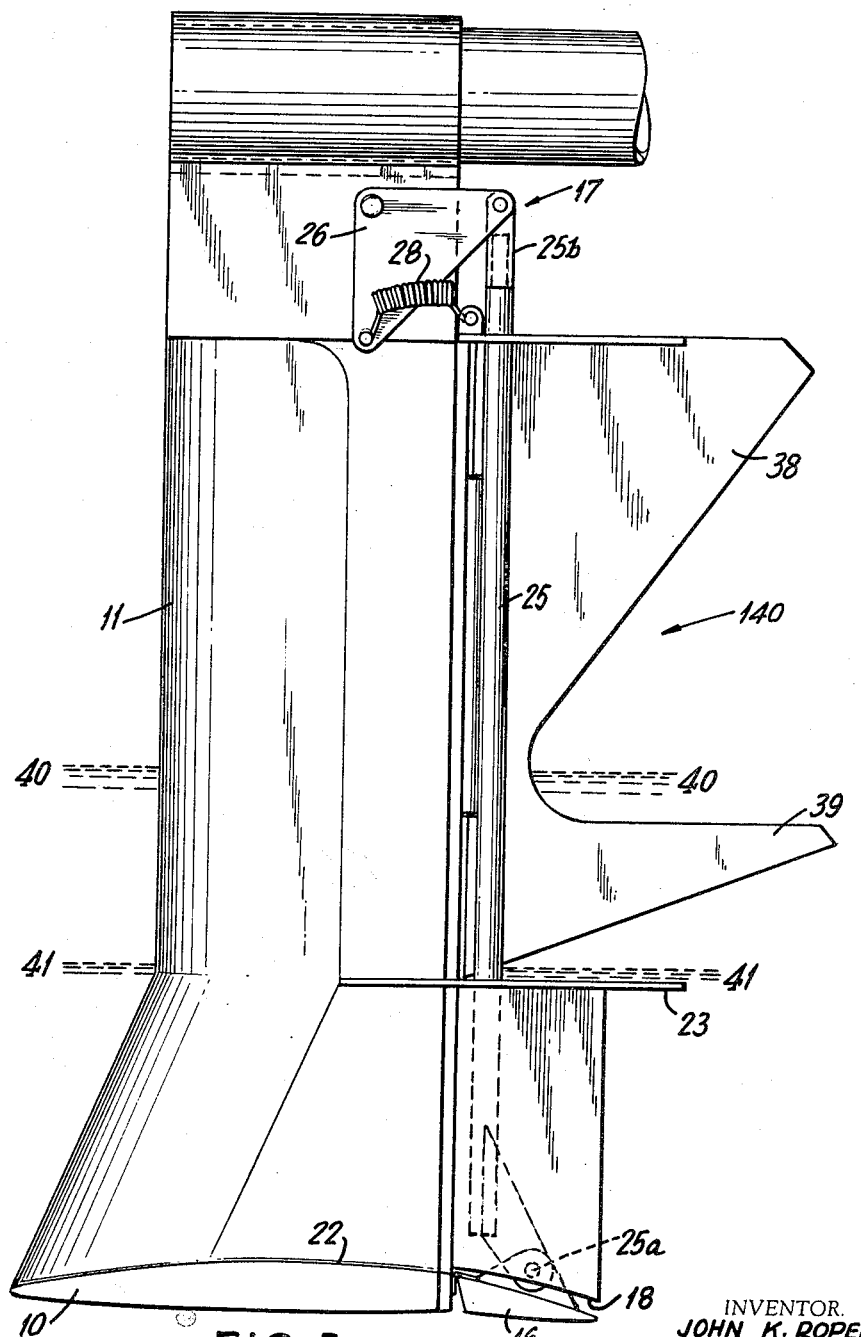
FIGURE 5 is a side view of a further embodiment of the present invention, illustrating a hydrofoil control system which includes a ventilated flap positioned as in FIGURE 1, which flap is additionally designed for providing self-compensating hydrodynamic lift operation at a variety of cruise speeds.

Push rod 27 may be replaced by a stiff spring such as shown at 28 in FIGURE 5, with said spring acting as a rigid normal linkage at most speeds but compressing when flap 14 is exposed to high water flow pressures associated with very high boat speeds. At such high speeds, when flap 14 is exposed to water flow, the large forces on said flap causing it to severely pivot would normally be transferred to pivotal hydrofoil 10 or flap 16 to provide an undesirably large lifting force to the boat. Spring 28, by compressing when subjected to the large forces associated with high boat speeds, absorbs the pivoting motion of flap 14 and thereby prevents said large lifting force to be applied to the boat.

Referring now to FIGURE 3, an embodiment of the present invention is shown wherein two vertical flaps 14 are mounted on strut 11 to respectively pivot about edges 15 and 15a thereof in opposite directions. In certain forms of hydrofoil craft having one vertical support strut mounted on the forward position of the boat hull and two on the rearward portion, a single vertical control flap mounted on said forward strut and pivoting only to one side thereof acts as a second, undesirable rudder and tends to turn the hydrofoil craft. In these forms of hydrofoil craft, as well as other forms having two vertical support struts mounted on the forward portion of the boat hull and only a rudder strut mounted on the rearward portion, the forces on the single vertical control flap mounted on each said strut creates large bending moments on each strut which must be structurally compensated for to avoid buckling of the strut. Oppositely pivoting flaps 14, extending rearwardly on opposite sides of fore and aft axis 19—19 of strut 11, create opposite bending moments on strut 11 which essentially balance each other out when sides 14a are exposed to water flow. No turning moment is therefore exerted on the hydrofoil craft, and strut 11 and its mounting to the boat hull need not be structurally reinforced. Flaps 14 may in fact be mounted at any point on strut 11 to extend rearwardly on opposite sides of said strut, such as on leading edge 21 or, respectively, at corresponding points along sides 13 and 20. Flaps 14 are ventilated, with sides 14b always having air pockets adjacent thereto when sides 14a are exposed to water flow, and are therefore not subject to the problem of flow breakaway discussed above.

Linkage 29 shown in FIGURE 3 is of the same general type and operation as linkage 17 shown in FIGURE 1. Triangular linkage 30 is pivotally connected at its fulcrum 30a to protruding section 31 which is integrally affixed to strut 11. Vertex 30b of said triangular linkage is pivotally connected to push rod 32 which is in turn pivotally connected to submerged flap 16. Horizontal rod 33 is integrally affixed to vertex 30c of triangular linkage 30, and the ends of said rod are pivotally connected to the ends of push rods 34 and 35, repectively. The opposite ends of push rods 34 and 35 are in turn pivotally connected to horizontal projections 36 and 37 of flaps 14, respectively. When flaps 14 are exposed to water flow, they pivot towards the fore and aft axis 19—19 of strut 11, and linkage 29 transmits said pivoting motion to flap 16. Push rods 34 and 35 may be replaced by stiff springs which are only compressible under high pressure, flaps 14 may be tapered, and submerged flap 16 may be eliminated with entire hydrofoil 10 pivotally connected to strut 11, all as discussed above in reference to FIGURE 1.

Figure 2:
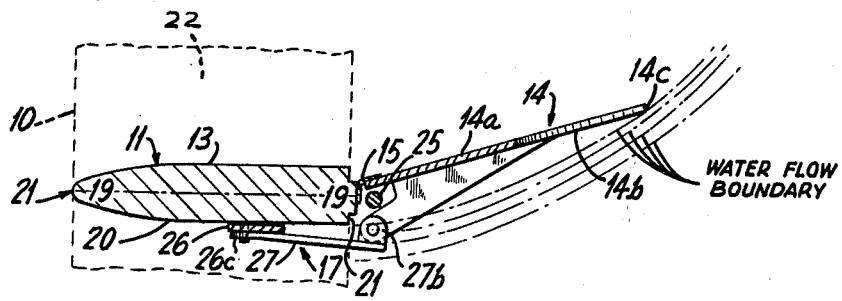
FIGURE 2 is a sectional view on line 2—2 in FIG. 1.

Referring to FIGURE 5, flap 140 is pivotally connected to strut 11 exactly as in FIGURE 1, and is linked by linkage 17 to flap 16 as shown in FIGURE 1, with the execption of stiff spring 28 described above. Flap 140 differs from flap 14 in FIGURE 1, however, in that it is configured to provide for the hydrofoil boat to cruise at two distinctly different cruise speeds with self-compensating control. In hydrofoil craft with flaps 14 having rectangular or triangular configurations as shown in FIGURES 1 and 2, the hydrofoil craft is designed to cruise at a given speed at which flaps 14 are completely above the surface of the water. This designed cruise speed of the boat may be varied upwardly or downwardly within a range of several percent by manually pivoting a horizontal submerged trimmer flap mounted to a vertical strut at the rear of the boat. This trimming flap is not part of the invention and is not shown in the drawings. Pivoting the trimmer flap causes the boat to nose upwardly or downwardly, depending on the direction of said pivoting, and the boat will cruise at the new speed with flaps 14 still out of the water. Certain hydrofoil craft, however, are required to cruise at speeds varying by several hundred percent, and it is desirable to maintain self-compensating control over the craft at said cruise speeds and also maintain the height of the craft at a relativley constant level above the water surface so that the craft at certain lower speeds is not overly affected by waves striking the hull.

The flap configuration shown in FIGURE 5, having two distinct sections 38 and 39 drawn approximately to scale, achieves this relatively constant height with level 40—40 defining the water level at approximately twenty knots cruising speed and level 41—41 defining the water level at approximately sixty knots cruising speed. The difference between these two levels is small compared to the height of the strut 11. Also, since section 39 is small in area, compared to section 38, it has small effect on self-compensating control of the craft at twenty knots. Two factors influence the difference in operating levels of the boat at different cruise speeds; namely, the outward angular offset of section 39 to section 38, and the horizontal length dimensions of section 39. As either or both of these factors increase, said difference in operating levels may, of course, be decreased, since section 39 becomes a more effective flap section. In FIGURE 5, for example, section 39 may be offset from section 38 to take a different angle than section 38 with fore and aft axis 19—19 of strut 11. The configuration of flap 14 in FIGURE 5 may in fact have a plurality of distinct sections for a plurality of distinct cruise speeds, and each section may take a variety of shapes depending upon the response characteristic desired.

While the invention has been disclosed herein in connection with particular embodiments and specific structural details, it is clear that numerous changes and modifications could be made by those skilled in the art without departing from the spirit and scope of the invention.

What is claimed is:

1. In combination with a water borne vessel, a passive self-compensating hydrofoil control system comprising a substantially vertical streamlined hydrofoil strut connected at its upper end to the hull of the vessel, said strut having a central fore-to-aft axis; a hydrofoil plane connected to the lower end of said strut and operable to maintain a hydrodynamic lift of the vessel to a minimum submergence of the hydrofoil plane below the free water surface at cruise speed of the vessel, said hydrofoil plane being formed at least in part by a horizontal flap pivotable relative to the strut; a vertical flap; means securing the vertical flap to said strut for pivotal movements about a vertical axis offset to one side of said fore-to-aft axis and from which said vertical flap extends rearwardly, the profile of said vertical flap forming a distinct discontinuity with the profile of said vertical strut, whereby one side of said vertical flap partly defines an air pocket when the opposite side of said vertical flap is exposed to the water flow, said vertical flap terminating at its lower end at a height above said hydrofoil plane which is greater than said minimum submergence; and mechanical linkage means interconnecting both of said pivotal flaps and operable, on application of unbalanced external forces to one flap causing it to pivot, to apply to the other flap a force acting to move said other flap toward a position for equalizing the forces applied to both flaps.

2. The combination as defined in claim 1, in which said hydrofoil plane includes a part fixed to the vertical strut, said horizontal flap being pivoted to said fixed part and forming a trailing edge of said plane.

3. The combination according to claim 1, wherein said mechanical linkage means includes a spring deformable only under high pressure and through which said force is applied.

4. The combination according to claim 1, wherein said vertical hydrofoil strut member has a substantially planar trailing surface and said substantially vertical flap is pivotally mounted thereon to extend rearwardly from one side of said trailing surface.

5. The combination according to claim 1, wherein said rearwardly extending, substantially vertical pivotal flap has a trailing edge which converges toward said vertical axis as said edge extends downwardly.

6. In combination with a water borne vessel, a passive self-compensating hydrofoil control system comprising a substantially vertical streamlined hydrofoil strut connected at its upper end to the hull of the vessel, said strut having a central fore-to-aft axis; a hydrofoil plane connected to the lower end of said strut and operable to maintain a hydrodynamic lift of the vessel to a minimum submergence of the hydrofoil plane below the free water surface at cruise speed of the vessel, said hydrofoil plane being formed at least in part by a horizontal flap pivotable relative to the strut; first and second vertical flaps; means securing said vertical flaps to the vertical strut for pivotal movements about corresponding vertical axes located at opposite sides, respectively, of said fore-to-aft axis and from which said vertical flaps extend rearwardly, the profile of each vertical flap forming a distinct discontinuity with the profile of the vertical strut, whereby each vertical flap has a surface adjacent said fore-to-aft axis and partly defining an air pocket when the opposite surface thereof is exposed to water flow, said vertical flaps terminating at their lower ends at a height above said hydrofoil plane which is greater than said minimum submergence; and mechanical linkage means connecting said vertical flaps to said horizontal flap and operable, on application of unbalanced external forces to the horizontal flap causing it to pivot, to apply to said vertical flaps forces acting to swing them in opposite directions toward positions such that the forces on said vertical flaps equalize the forces on the horizontal flap.

7. The combination according to claim 6 wherein said mechanical linkage means comprises a first push rod, an intermediate triangular linkage, and second and third push rods, one end of said first push rod being pivotally connected to said horizontal flap, the other end of said first push rod being pivotally connected to a first vertex of said triangular linkage, said traingular linkage being pivotally connected to said vertical strut member at a second vertex, one end of each of said second and third push rods being pivotally connected to said triangular linkage at a third vertex, and the other ends of said second and third push rods being pivotally connected, respectively, to said vertical strut member flaps.

8. In combination with a water borne vessel, a passive self-compensating hydrofoil control system comprising a substantially vertical streamlined hydrofoil strut connected at its upper end to the hull of the vessel, said strut having a central fore-to-aft axis; a hydrofoil plane connected to the lower end of said strut and operable to maintain a hydrodynamic lift of the vessel to a plurality of minimum submergences of the hydrofoil plane below the free water surface at a plurality of distinct cruise speeds of the vessel, said hydrofoil plane being formed at least in part by a horizontal pivotable relative to the strut; a vertical flap which includes a plurality of distinct sections, each said section substantially terminating at its lower end at a height above said hydrofoil plane which is greater than a minimum submergence at a cruise speed; means securing the vertical flap to said strut for pivotal movements about a vertical axis offset to one side of said fore-to-aft axis and from which said vertical flap extends rearwardly, the profile of said vertical strut flap forming a distinct discontinuity with the profile of said vertical strut, whereby one side of said vertical flap partly defines an air pocket when the opposite side of said vertical flap is exposed to the water flow; and mechanical linkage means interconnecting both of said pivotal flaps and operable, on application of the unbalanced external forces to one flap causing it to pivot, to apply to the other flap a force acting to move said other flap toward a position for equalizing the forces applied to both flaps.

9. The combination according to claim 8, in which said vertical flap includes upper and lower sections forming a gap between them, said lower section being of smaller area than the upper section.

10. In combination with a water borne vessel, a passive self-compensating hydrofoil control system comprising a substantially vertical streamline hydrofoil strut connected at its upper end to the hull of the vessel, said strut having a central fore-to-aft axis; a hydrofoil plane connected to the lower end of said strut and operable to maintain a hydrodynamic lift of the vessel to a minimum submergence of the hydrofoil plane below the free water surface at cruise speed of the vessel, said hydrofoil plane being formed at least in part by a horizontal flap pivotable relative to the strut; hinged means on said vertical strut for continuously maintaining an air pocket on one side of said means, said hinged means including a vertical flap pivotable on a vertical axis and extending rearwardly therefrom, said vertical flap having a profile forming a distinct discontinuity with the profile of said streamlined vertical strut, whereby one side of said vertical flap partly defines an air pocket when the opposite side of said vertical flap is exposed to the water flow, said vertical flap terminating at its lower end at a height above said hydrofoil plane which is greater than said minimum submergence; and mechanical linkage means interconnecting both of said pivotal flaps and operable, on application of unbalanced external forces to one flap causing it to pivot, to apply to the other flap a force acting to move said other flap toward a position for equalizing the forces applied to both flaps.

No references cited.

FERGUS S. MIDDLETON, *Primary Examiner.*

UNITED STATES PATENT OFFICE
CERTIFICATE OF CORRECTION

Patent No. 3,170,432                                            February 23, 1965

John K. Roper

It is hereby certified that error appears in the above numbered patent requiring correction and that the said Letters Patent should read as corrected below.

Column 4, line 48, for "therbey" read -- thereby --; line 68, for "joints" read -- joins --; column 6, line 21, for "o fthe" read -- of the --; column 8, line 18, for "self-comepnsating" read -- self-compensating --; line 52, for "traingular" read -- triangular --; line 69, after "horizontal" insert -- flap --; column 9, line 8, strike out "the".

Signed and sealed this 27th day of July 1965.

(SEAL)
Attest:

ERNEST W. SWIDER                                            EDWARD J. BRENNER
Attesting Officer                                               Commissioner of Patents